Dec. 15, 1959  P. G. HARTER ET AL  2,916,978
SINGLE-LENS REFLEX CAMERA
Filed April 12, 1956  3 Sheets-Sheet 1

PAUL G. HÄRTER
ERWIN E. STAUDT
INVENTORS

BY
ATTORNEYS

Dec. 15, 1959  P. G. HARTER ET AL  2,916,978
SINGLE-LENS REFLEX CAMERA

Filed April 12, 1956  3 Sheets-Sheet 2

PAUL G. HÄRTER
ERWIN E. STAUDT
INVENTORS

BY
ATTORNEYS

PAUL G. HÄRTER
ERWIN E. STAUDT
INVENTORS

BY

ATTORNEYS

United States Patent Office 2,916,978
Patented Dec. 15, 1959

2,916,978

SINGLE-LENS REFLEX CAMERA

Paul G. Harter, Stuttgart-Wangen, and Erwin E. Staudt, Stuttgart, Germany, assignors to Eastman Kodak Company, Rochester, N.Y., a corporation of New Jersey Application April 12, 1956, Serial No. 577,681

Claims priority, application Germany April 30, 1955

20 Claims. (Cl. 95—42)

The present invention relates to a camera, and more particularly to a reflex camera of the single lens type, in which the cocking or setting of the shutter takes place at the same time and jointly with the film advancing or winding.

Such film advancing shutter-cocking arrangements are well known in photographic cameras; but, in the case of a single lens reflex camera, there is still the additional problem that, simultaneously with the advancing of the film and cocking of the shutter, the light blocking flap must be swung in front of the image aperture and the mirror must be swung into viewing position. When the shutter release trigger or member is actuated to make an exposure, obviously the mirror and flap must be swung out of the path of the light rays passing through the lens before the shutter is opened to make an exposure.

Arrangements that are suitable for solving these problems are already well known, but they present a complicated and, therefore, expensive construction which requires a considerable amount of space in the camera. Expensive gearing designs have already been suggested, in addition to the gear for the film transport, and shutter cocking, and were intended for the control of the parts that have to be moved out of the way to make an exposure.

The present invention provides a structure that makes it possible to accomplish the desired function yet is kept simple. This is possible, according to the present invention, by the fact that during the advancing of the film a single gear, that is connected with the film transport arrangement, swings the light blocking flap in front of the image aperture, and also swings the mirror into viewing position and also cocks the shutter. In addition, immediately before an exposure is made, a portion of the same gearing causes the mirror and the light blocking flap to swing out of the path of the taking light rays which pass through an objective lens.

The present invention has, therefore, as its principal object, the provision in a single lens reflex camera of a new and improved mechanism for moving the light blocking flap and mirror into and out of the path of the light rays passing through the object lens.

Still another object of the invention is the provision of a mechanism by which the flap and mirror are moved into the path of the light rays by means controlled by the film moving or advancing means and in timed relation therewith.

Yet another object of the invention is the provision of novel means for holding or retaining the flap and mirror in the light path.

And still another object of the invention is the provision of an improved and simple arrangement for controlling the movement of the flap and mirror out of the light path by means under the control of the shutter trigger or actuating member.

And yet another object of the invention is the provision of a novel mechanism for connecting the film winding mechanism releasably to the shutter cocking or setting mechanism so the setting of the shutter is controlled from the film advancing mechanism. After the shutter is set, the film winding mechanism is completely and automatically disconnected from the setting mechanism so that the film winding mechanism may be returned to its initial or starting position.

A further object of the invention is the provision of an auxiliary locking or holding means for the flap and mirror to prevent accidental jarring of the flap and mirror out of the light path.

To these and other ends the invention resides in certain improvements and combinations of parts, all as will be hereinafter more fully described, the novel features being pointed out in the claims at the end of the specification.

Figure 5:
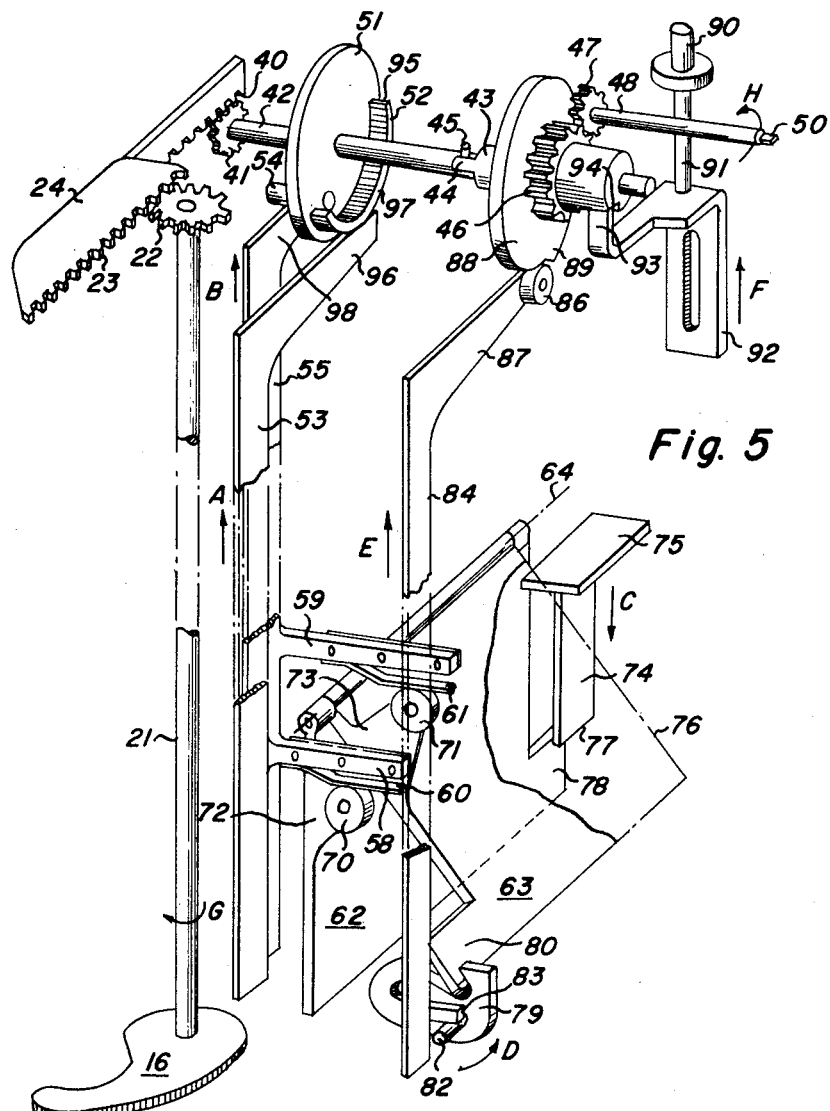
Figure 6:
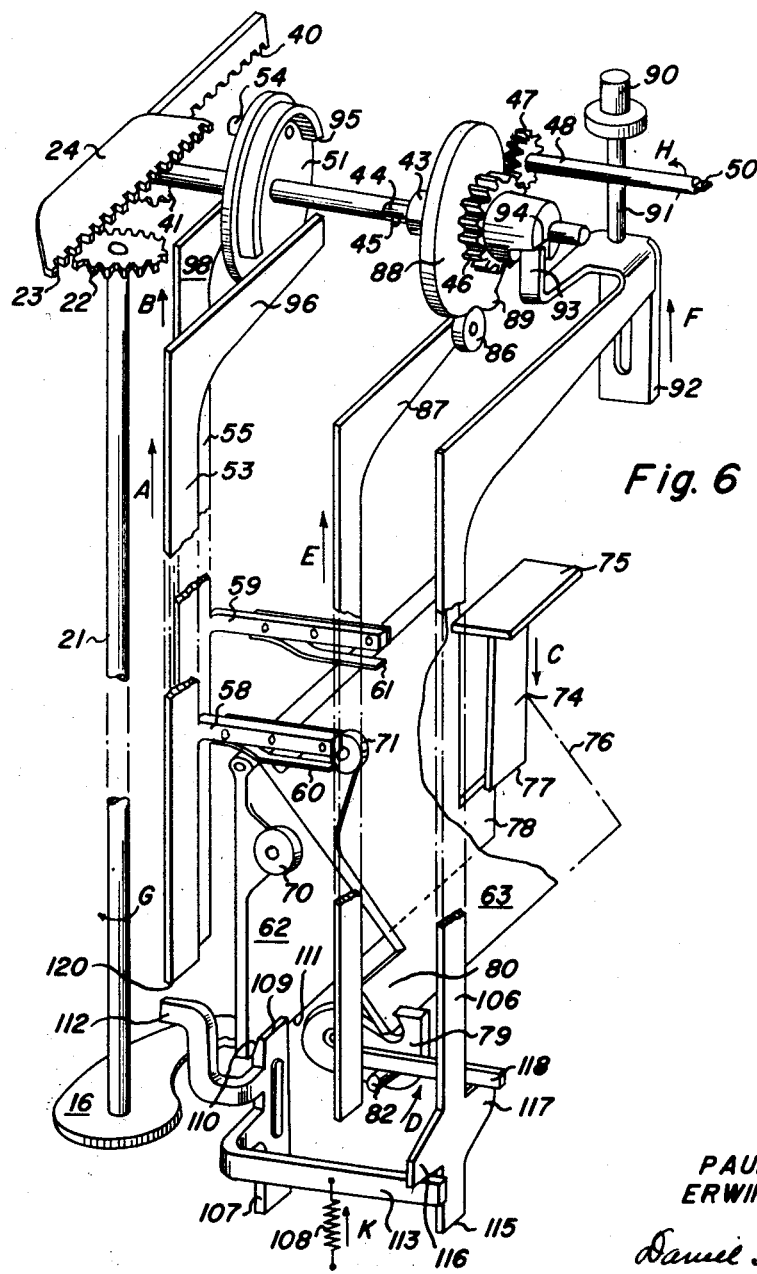

Fig. 5 is a perspective view of one mechanism for winding the film, cocking the shutter and moving the mirror and light blocking flap into and out of the light path. For the purpose of clarity, the camera body, lens and associated parts, have been omitted in this view; and Fig. 6 is a view similar to Fig. 5 but showing the position of the parts at the end of the film winding operation and before release of the film winding lever, and also showing an auxiliary holding means for the flap and mirror to prevent unintentional displacement or swinging of the flap and mirror out of the light path as a result of jarring the camera. Here again, certain parts have been omitted for the purpose of clarity.

Similar numerals throughout the various views indicate the same parts.

The present invention is embodied, in the preferred embodiment illustrated, in a camera body 10, the front 11 of which has mounted thereon an objective lens 12. The top 13 of the camera is provided with a viewing device 14 for viewing an image formed by the lens 12 and reflected to a viewing screen or mirror by means to be later described. The bottom 15 of the camera carries an oscillating winding lever 16 which is connected to the film winding and shutter setting mechanism in a manner to be later described.

Figure 1:
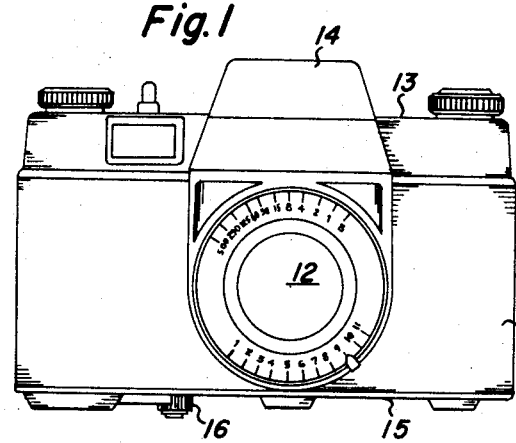
Fig. 1 is a front view of a single lens reflex camera of the type with which the structure of the present invention may be used.
Figure 2:
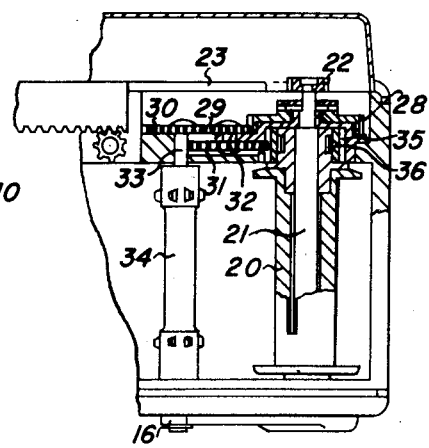
Fig. 2 is a partial back elevation view of the camera illustrated in Fig. 1, with parts in section, showing the gear train for rotating the take-up spool and the film measuring roller.

In order to wind the film onto the take-up spool 20, the lever 16 has imparted manually thereto an oscillating or back-and-forth movement. The lever 16 is carried on the lower end of a shaft 21 the upper end of which has mounted thereon a gear 22 which meshes with a toothed portion 23 of a rack 24 located inside the camera body. As shown in Fig. 2, the shaft 21 is located inside the take-up spool 20. A part 25 of a one-way clutch is axially movable on shaft 21 but is keyed against rotation relative to the shaft. By means of a spring 26 part 25 is pressed against the counterpart 27 of a one-way clutch, part 27 forming the hub of a gear 28. The latter meshes with a gear 29 which, in turn, meshes with a gear 30 and is rigidly connected with a gear 31 by a shaft 32. The gear 30 is fastened to shaft 33 of a film measuring sprocket 34. The gear 31 meshes with a gear 35 which is coaxially located around the take-up spool 20 driving it by means of a slip clutch 36. On the return stroke of the winding lever 16, the part 25 of the one-way clutch 25—27 will be lifted against the pressure of the spring 26 and the connection to sprocket 34 and the film spool 20 thereby disrupted.

The toothed section 40 of the rack 24 engages a gear 41 which is carried by a shaft 42. A driving element 43 is placed on shaft 42 so that it can be turned loosely thereon and is connected with shaft 42 by means of a coupling lug 44 and a shaft carried coupling pin 45 arranged in the manner shown in Fig. 5. On the drive element is fixedly arranged a gear 46 which meshes with a gear 47 fixedly connected with a shaft 48 that leads to the shutter of a type such as disclosed in British Patent 769,086 positioned in the shutter housing 49, see Fig. 4. The end 50 of the shaft 48 has a profiling; e.g. a flat portion that engages a counterpart in the shutter and transmits the turning movement of shaft 48 to certain elements of the shutter for cocking or setting the latter. The shaft 42 has connected thereto a disc 51 one side of which has an axially extending arcuate shaped projection 52, as best shown in Figs. 5 and 6, and works in cooperation with a slide bar 53. A pin 54 is riveted or secured to the opposite side of disc 51 and extends axially therefrom and near the periphery thereof, as shown in Figs. 5 and 6. The pin 54 is positioned to engage a second slide bar 55. The slide bars 53 and 55 are located within the camera housing or body 10 and are pressed upward, as viewed in Figs. 4 and 5, by means of springs 56 and 57, respectively, which always press the slide bars 53 and 55 against parts 52 and 54, respectively. The slide bars 53 and 55 are provided with laterally extending arms 58 and 59 on which leaf springs 60 and 61 are arranged, see Figs. 5 and 6. A light blocking flap 62 and a viewing mirror 63 are positioned on the axis 64 in such a way that they are under the influence of a torsion spring or springs, not shown, which always tend to swing the flap 62 and mirror 63 upward and out of the taking or exposing light rays which pass through the lens 12, as is deemed apparent from an inspection of Fig. 4.

Figure 4:
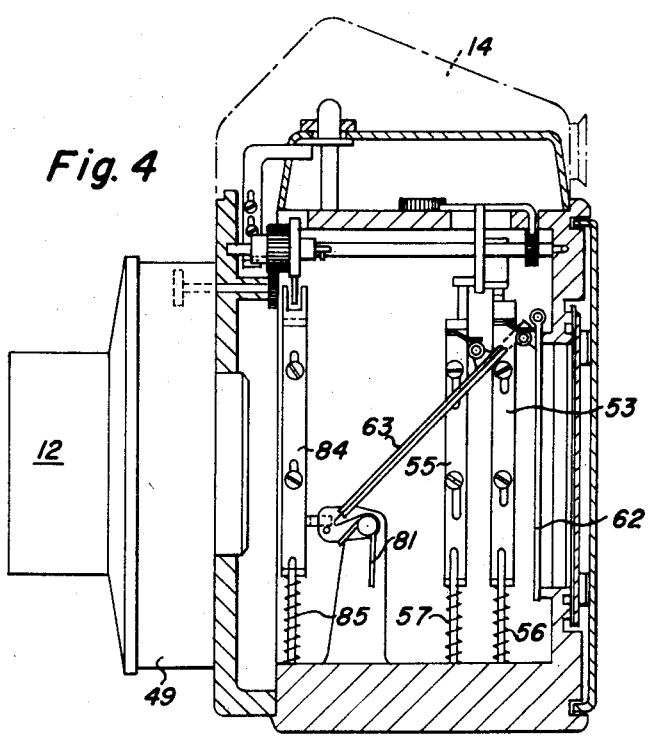
Fig. 4 is a side elevation view of the control mechanisms of the present invention, showing the relation of the various control slide bars, the mirror and the light blocking flap.
Figure 3:
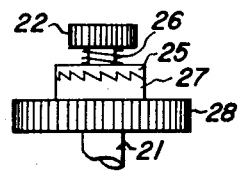
Fig. 3 is a partial view of the mechanism illustrated in Fig. 2, but on a larger scale than the latter, showing the clutch arrangement for connecting the gear train to the film take-up spool.

Rollers 70 and 71 are mounted on flanges 72 and 73 provided on flap 62 and mirror 63, as best shown in Figs. 5 and 6. These rollers are positioned in the path of the arms 58 and 59 of the slide bars 53 and 55. When there is a downward movement of the slide bars 53 and 55, in a manner to be later described, the springs 60 and 61 engage and press against the rollers 70 and 71 to swing the flap 62 and mirror 63 into viewing position or into the path of the light rays passing through lens 12, as shown in Figs. 4, 5 and 6. The mirror 63 operates in conjunction with the slide bar 74 which is under the influence of a spring, not shown, which acts on the bar 74 in the direction of the arrow C, Figs. 5 and 6. The angled end 75 of slide bar 74 overlaps the right edge 76 of the mirror 63 whereby the position of the slide bar 74 is dependent upon the position of the mirror 63. The spring that acts on the mirror 63 is, therefore, constructed stronger than the spring acting on the slide bar 74, so that its effect is counteracted by the force of the first spring when the edge 76 in its upward swing strikes against end 75 of the bar 74.

The lower end 77 of the slide bar 74 moves in front of a lateral flange 78 of the light blocking flap 62 when the parts 62 and 63 are in viewing position. Thus, the light blocking flap 62 is held in front of the image or camera aperture, not shown, of the camera and thereby prevents any entrance of light onto the light sensitive layer of the photographic material as long as the shutter is open for the purpose of observing or viewing the subject which is to be photographed. The mirror 63 is held in viewing position by a spring pawl 79 that clamps a lateral flange 80 of the mirror 63. A spring 81, see Fig. 4, acts on the pawl 79 in the direction of the arrow D, Figs. 5 and 6. A pin 82 is riveted or otherwise secured to pawl 79 and projects laterally therefrom. The pawl 79 is actuated by means of an arm 83 of the slide bar 84 and is located inside the camera body and is under the force of a spring 85 which imparts a force in the direction E, Figs. 5 and 6.

A guide roller 86 is provided on an angled arm 87 of the slide bar 84. This roller 86, as a result of the spring force E acting on the slide bar 84, is constantly held in contact with the outer edge of a cam 88 which is fixedly connected with the drive element 43. One part of the circumference of cam 88 has an elevation 89 which acts as a control cam to press bar 84 downward against the spring force E when the elevation 89 strikes against the guide roller 86 whereby the pawl 79 is actuated through an arm 83 and pin 82. A shutter release or actuating button 90 is arranged on the camera body and is connected through a push rod 91 with a spring actuated slide bar 92 which is located inside the camera body. A spring, not shown, tends to move the slide bar 92 and consequently the button 90 in the direction of the arrow F, Figs. 5 and 6. The sharp angled end 93 of the slide bar 92 works in conjunction with the notch-like indentation 94 in the drive element 43.

The above-described mechanism operates as follows: by swinging or oscillating lever 16 up to a stop, not shown, the film advances the distance of one frame. At the same time, the shutter is cocked through gear 22, rack 24, gear 41, shaft 42, coupling 44 and 45, drive element 43, gears 46 and 47, and shaft 48.

During the turning movement of the shaft 42, on which the disc 51 is fixed, the edge 95 of the projection 52 strikes against the angled arm 96 of the slide bar 53 and presses the latter downward against the force of spring 56. The spring 60 that is connected with the arm 58 of slide bar 53 thereby presses on the guide roller 70 of the light blocking flap 62 swinging the flap clockwise as viewed in Figs. 5 and 6, in front of the image area of the camera and into the path of the light rays passing through the objective lens 12. If the downward movement of the slide bar 53 should not be completed when the flap 62 has reached the end of its travel, the spring 60 will take up any play. During the entire lowering movement of shaft 42 and disc 51, the circumference 97 of the projection 52 of disc 51 slides on arm 96 of slide bar 53 and consequently holds the latter in its lowered position, as shown in Fig. 5. A short time after edge 95 strikes against the arm 96 of the slide bar 55, the pin 54 strikes against the angled arm 98 of the slide bar 55, and presses the latter downward against the action of spring 57. In so doing, the spring 61 that is connected with the arm 59 presses on the guide roller 71 of the viewing mirror 63 and swings the latter into viewing position, as shown in Fig. 5. Here again the spring 61 acts as a compensating means in the case of any possible overtravel of the slide bar 55.

As a result of the downward swing of the mirror 63, the angled end 75 of the slide bar 74 overlying the edge 76 of the mirror 63 is set free so that the force of spring C can take effect and move the slide bar 74 downward. In its end position the lower end 77 of the slide bar 74 lies in front of the lateral flange 78 of the flap 62. Upon reaching its viewing position the mirror 63 is engaged by the spring pressed pawl 79.

The position shown in Fig. 5 is the position of the parts at the end of the film winding operation and with the shutter cocked or tensioned. The lever 16 is returned to its initial position by means of a spring, not shown, which acts on shaft 21 to rotate the latter clockwise as indicated by the arrow G in Figs. 5 and 6. This return movement of lever 16 is transmitted from gear 22, rack 24, gear 41 and shaft 42. The coupling 44 and 45 is disconnected since the drive element 43 is secured in its end position by the engagement of the angled end 93 of the slide bar 92 in notch 94, and consequently the element 43 does not take part in the return movement of the shaft 42.

During the return movement of the shaft 42 and disc 51, the pin 54 and the projection 52 move away from arms 98 and 96 of the slide bars 55 and 53, respectively, so that both slide bars are moved to their upward position by springs 56 and 57 and in this position they no longer have any contact with the light blocking flap 62 or mirror 63. The flap 62 is held in its lower position by means of the slide bar 74, the lower end 77 of which lies in front of the latter flange 78 of the flap 62. As mentioned above, the mirror 63 is held in viewing position by means of pawl 79.

By pressing on the release button 90, the slide bar 92 is moved downward against the action of the spring force F, so that the angled end 93 is withdrawn from notch 94 in the drive element 88. In this way the drive element 88 is set free and the force that is inherent in the shutter turns shaft 48 in the direction of the arrow H. At the beginning of the turning movement of the shaft 48, the shutter blades which have been opened for viewing are now closed. This closing takes place up to the time when the cam lobe 89 of the cam 88 strike against roller 86. The cam lobe 89 thereby presses the guide roller 86 and consequently the slide bar 84 downward against the spring force E. This downward movement is transmitted from arm 83 of the slide bar 84 and pin 82, and consequently pawl 79 swings the latter clockwise, as viewed in Fig. 5, against the spring force D. In so doing, the pawl 79 releases the mirror 62 and sets it free, and the spring, not shown, swings the mirror counterclockwise and upward as viewed in Fig. 5, and out of the path of the light rays passing through the lens 12. Shortly before reaching its uppermost position, the side edge 76 of mirror 63 springs against the angled end 75 of the slide bar 74 and carries the latter along with it against the action of the spring force C. In this way, the lower end 77 of the slide bar 74 releases the lateral flange 78 of the flap 62 so that the latter can, under the influence of a spring not shown, follow the mirror and can also by swinging out of the path of the light rays passing through lens 12.

The position of the slide bar 74 with respect to the mirror 63 is such that the release of the flap 62 does not take place until the mirror has blocked off the light coming through the viewfinder opening at the top of the camera. Also, the spring acting on slide bar 74 fulfills the purpose of braking the mirror 63 when the latter strikes against the angled end 75 of the slide bar 74 slightly before the mirror reaches its upper home position. After the mirror 63 and flap 62 have been swung out of the path of the light rays passing through lens 12, the shutter in continuing its run-down operation is actuated to make the exposure. After the exposure has been made all the parts are again located in their initial position and are ready for the next film advancing and cocking movement.

The functional operation of the parts makes it necessary to keep the tension of the springs represented by the forces C, D, E, within certain limits. This, however, involves the risk that when the camera is jarred, banged, or the like, the bulk of the spring-acting parts 74—84, is sufficient to overcome the spring tension acting on the parts, and thus causes unintentional swinging of the flap 62 and mirror 63 out of the light path.

In order to overcome these disadvantages, the present invention provides a modified arrangement, Fig. 6, which comprises an additional protection against unintentional swinging of the mirror 63 and/or the light blocking flap 62 out of the path of the light rays as a result of jarring, or the like, of the camera. These specific safety means work, on the one hand, in conjunction with the releasing mechanism, and on the other hand with the cocking device, or are controlled by these parts.

More precise details will be deemed apparent from the description of an example of an embodiment as illustrated in somewhat schematic form in Fig. 6. All parts which correspond to the above-described embodiments shown in Figs. 1–5, are designated by the same numerals. Also, as the construction of the modified arrangement, in general, is exactly the same as the structures shown in Figs. 1–5, and above described, a further description of these parts is not deemed necessary. The position of the parts in Fig. 6 correspond to the idle position of the lever 16 after the advancement of the film and the cocking of the shutter has been completed in which case flap 62 is located in viewing position.

Referring now to the modified arrangement illustrated in Fig. 6, the slide bar 92 has an arm 106 which is angled downward and which extends within the range of pawl 79. A slide bar 107 is under the influence of a spring 108 which acts on bar 107 in the direction of the arrow K, and thus holds the bar 107 in the position shown in Fig. 6. When the slide bar 107 is in this position, the upper end 109 is located in front of the light blocking flap 62 and thus secures the flap in position in front of the aperture of the camera. The upper end 109 of the slide bar 107 has appropriately a bevel 110 which facilitates riding of the slide bar 107 on the bottom edge 111 of the flap 62. An arm 112 of the slide bar 107 extends upward into the path of the slide bar 53, whereas an arm 113 of the slide bar 107 extends as far as the arm 106 of the slide bar 92. The arm 106 has, close to its lower end 115, projections 116 and 117 which work in conjunction with the arm 113 of the slide bar 107, and with the extended arm 118 of the slide bar 87, respectively.

The mode of operation of this modified structure, Fig. 6, is as follows:

When the parts are in the position shown in Fig. 6, the shutter has been tensioned or cocked and an exposure can be made. The arm 118 of the slide bar 87 is supported by the projection 117 of the bar 106 of the slide bar 92. The spring tension F acting on the slide bar 92 is adjusted to be so strong that even strong jars of the camera are not able to change its position. As a result of this, even if the bulk of the slide bar 87 should of itself be sufficient when there are jars in the camera, to overcome the tension E that is necessarily weak, any unintentional release of the mirror 63 is prevented as a result of the application of the slide bar 118 against the projection 117 of the slide bar 106.

Since the spring tension C working on the slide bar 74 must likewise be kept relatively weak for the conditions to operate, there is a risk that, as a result of the jars to the camera, the light blocking flap 62, which is held by the slide bar 74, might be released unintentionally. This, however, is prevented by the fact that the upper end 109 of the slide bar 107 is positioned in front of the light blocking flap 62. The spring tension K working on the slide bar 107 is sufficient to prevent any undesirable change of position of the slide bar 107 even if there should be a strong jar to the camera.

By pressing the shutter release button 90, the slide bar 92 is moved downward against the spring tension F. In so doing, the projection 116 of the slide bar arm 106 presses on the arm 113 so that the latter participates in the downward movement of the slide bar 92 and leaves the path of the light blocking flap 62. The notch 94 of the drive element 43 is arranged in such a way that any release of the highly angled end 93 of the slide bar 92 cannot occur until the slide bar 107 has already left the path of the flap 62. During the downward movement of the slide bar 92, the projection 117 has moved out of the path of the slide bar arm 118 so that now the entire device can operate uninterruptedly in manner described in connection with the embodiment illustrated in Figs. 1–5.

After releasing the button 90, the slide bar 107, in addition to the slide bar 92, also returns to its initial position as a result of the spring tension K. When the film is to be advanced again it is, therefore, necessary to move the slide bar 107 temporarily out of the path of the flap 62 in order to clear the path of the flap, so that the latter can move into position to cover the exposure aperture at the back of the camera. This takes place by means of the lower end 120 of the slide bar 53 which works in conjunction with the arm 112 of the slide bar 107. According to the structure of Fig. 6, during the downward movement, the arm 58 of the slide bar 53 presses with its compensating spring 60 against the roller 70 of the flap 62 and tilts the flap into the position shown in Fig. 6 in front of the camera aperture. During this downward movement of the slide bar 53, its lower end 120 strikes against the arm 112 and presses the latter against the force of the spring K, and out of the path of the flap 62. Upon releasing of the lever 16, the slide bar 53 returns again to the position shown in Fig. 5, as a result of the spring force A acting on it, whereby the spring force K comes into effect and moves the slide bar 107 again in front of the flap 62. The upper end 109 of the slide bar 107 is suitably provided with a bevel 110 so that the slide bar 107 can slide past without striking against the edge 111 of the flap 62. It is also possible, by means of the bevel 110, that the slide bar 107 act like a wedge on the flap 62 so that the latter is always pressed against the exposure aperture of the camera.

The present invention thus provides a single lens reflex camera in which the cocking or setting of the shutter takes placed in timed relation with the winding of the film and is controlled therefrom. Also, the winding of the film is utilized to move the light blocking flap and the mirror into the path of the light rays passing through a camera lens. The actuation of the shutter trigger or actuating member serves to move the flap and mirror out of the light path before the exposure is made. In addition, an auxiliary locking or holding means is provided to prevent release of the flap and the mirror due to jarring of the camera.

While one embodiment of the invention has been disclosed, it is to be understood that the inventive idea may be carried out in a number of ways. Therefore, this application is not to be limited to the precise details described, but is intended to cover all variations and modifications thereof which fall within the scope of the appended claims.

What we claim and desire to secure by Letters Patent of the United States is:

1. In a single-lens reflex camera, the combination with a camera body, an objective, film winding means and shutter cocking means carried by said body, a mirror and a light blocking flap pivoted within said body behind said objective, of a rotatable control disc driven by said winding means, separate means on said control disc connectable to and for moving said mirror and flap into the path of the light rays passing through said objective, means for holding said mirror in said path, blocking means movable by said mirror into the path of said flap to retain the latter in said path, means to connect said cocking means releasably to said winding means so that operation of the latter to wind film will cock said shutter, the cocking means then being automatically and completely disconnected from said winding means, a shutter tripping member, means controlled by said tripping member to actuate means including the cocking means to release said mirror, means operable upon release of the mirror to move said mirror out of said path, means on said mirror to move said blocking member out of blocking relation with said flap, and means operable upon such movement of the blocking member to move said flap out of said path.

2. In a single-lens reflex camera, the combination with a camera body, an objective, a mirror and light blocking flap pivoted in said body behind said objective and movable into and out of the light path of the rays passing through said objective, of a film winding mechanism, a shutter cocking mechanism, connecting means to releasably connect said mechanisms whereby actuation of said film winding mechanism simultaneously advances said film and moves said shutter cocking mechanism to cock a shutter, slide bars mounted in said body, means associated with said winding means and engaging said bars to move said bars in one direction, means on said bars engaging said mirror and flap to move the mirror and flap into said path when said bars are moved in said one direction, means engaging said mirror to hold the latter in said path, a blocking member movable into blocking relation with said flap to retain the latter in said path, said connecting means serving to disconnect said winding means from said cocking means to enable the winding means to return to an initial position, the returning of said winding means moving the bar moving means out of engagement with said bars to free the latter, means to move said bars out of holding relation with said mirror and flap, a shutter release member associated with said cocking mechanism, a slide bar connecting said cocking mechanism to said mirror locking means so that release of said cocking mechanism by said release member will actuate said last slide bar to release said mirror, means operable upon release of the mirror to move said mirror out of said path, means on said mirror engaging and moving said blocking member out of blocking relation with said flap, and means operable upon said movement of the blocking member to move said flap out of said path.

3. In a single-lens reflex camera, the combination with a camera body, an objective, film winding means and shutter cocking means carried by said body, a mirror and a light blocking flap pivoted within said body behind said objective, means controlled by said winding means to move said mirror and flap into the path of the light rays passing through said objective, means to engage and hold said mirror in said path, means controlled by the movement of said mirror into said path and movable in blocking relation with said flap to retain the latter in said path, an auxiliary slidable member, a portion of said slidable member positioned in blocking relation with said flap, a shutter release member, means controlled by said cocking means and actuated by said release means tending to move said mirror holding means out of holding relation with said mirror upon release of said shutter, a slidable bar connected to said shutter release and associated with said slidable member and mirror holding means, means on said bar positioned in the path of a portion of said mirror holding means to prevent the release thereof, the actuation of said shutter release serving to move said means on said bar out of holding relation with said portion of said mirror holding means and to move said bar into engagement with a part of said slidable member to move said portion out of blocking relation with said flap so that action of said means controlled by the cocking means will move the mirror holding means out of holding relation with said mirror to free the latter, means to move the freed mirror out of said light path, means on said mirror engaging said first blocking means to move the latter out of blocking relation with said flap to free the latter, and means to move said flap when freed out of said light path.

4. In a single-lens reflex camera, the combination with a camera body, an objective, film winding means and shutter cocking means carried by said body, a mirror and a light blocking flap pivoted within said body behind said objective, means controlled by said winding means to move said mirror and flap into the path of the light rays passing through said objective, means to engage and hold said mirror in said path, means controlled by the movement of said mirror into said path and movable in blocking relation with said flap to retain the latter in said path, an auxiliary slidable member, a portion of said slidable member positioned in blocking relation with said flap, a shutter release member, means controlled by said cocking means and actuated by said release means tending to move said mirror holding means out of holding relation with said mirror upon release of said shutter, a slidable bar connected to said shutter release and associated with said slidable member and said mirror holding means, means on said bar positioned in the path of a portion of said mirror holding means to prevent the release thereof, the actuation of said shutter release serving to move said means on said bar out of holding relation with said portion of said mirror holding means and to move said bar into engagement with a part of said slidable member to move said other portion out of blocking relation with said flap so that action of said means controlled by the cocking means will move the mirror holding means out of holding relation with said mirror to free the latter, means to move the freed mirror out of said light path, means on said mirror engaging said first blocking means to move the latter out of blocking relation with said flap to free the latter, means to move said flap out of said light path, means to return said bar and said slidable member to their initial position after actuation of said shutter, and means on said slidable member positioned in the path of the means controlled by said winding means for moving said flap and operated by the winding mechanism to shift the second blocking member out of the path of said flap to enable the latter to be moved into the light path.

5. In a single lens reflex camera having a camera body, a shutter, an objective, and a spring urged mirror and spring urged light blocking flap pivoted within said body behind the objective to move between an operative position in which they intercept light rays passing through the objective, and a normal inoperative position in which they are removed from the path of said light rays, the combination comprising; film winding means; control means connecting said film winding means to said mirror and light blocking flap; shutter driving means; clutch means releasably connecting said control means to said shutter driving means, said control means and shutter driving means operable upon advance of the film by said film winding means to simultaneously cock said shutter and move said mirror and flap into said operative position; mirror and flap retaining means for releasably holding said mirror and flap in said operative position; a latch for releasably holding said shutter in a cocked position; and actuating means including a part of said shutter driving means, operable upon release of said latch to release said mirror and flap retaining means for movement of said mirror and flap by their springs into said inoperative position in timed relation with the operation of said shutter.

6. The combination according to claim 5 wherein said control means comprises a shaft connected to said film winding means and carrying cam means for moving said mirror and flap upon rotation of said shaft.

7. The combination according to claim 6 wherein said cam means comprises a disc having separate means thereon connected to, and for moving, said mirror and flap respectively into said operative position.

8. The combination according to claim 7 wherein said separate means comprises an arcuate projection mounted on one side of said disc and a pin mounted on the other side.

9. The combination according to claim 5 wherein said control means comprises a shaft connected to said film winding means and carrying cam means for moving said mirror and flap upon rotation of said shaft, and said clutch means comprises a pin carried by said shaft adapted to operatively engage a lug formed by said shutter driving means.

10. The combination according to claim 5 wherein said shutter driving means comprises a rotatable member including a cam wheel, and said actuating means comprising a cam follower connected to said mirror and actuable by said cam wheel to release said mirror.

11. The combination according to claim 5 wherein said shutter driving means comprises a rotatable member forming a shoulder, and said latch comprises a reciprocally movable member adapted to releasably engage said shoulder.

12. The combination according to claim 5 wherein said control means comprises a shaft connected to said film winding means, said shutter driving means comprises a rotatable member mounted for rotation on said shaft, and said clutch means comprises a pin carried by said shaft adapted to engage a lug formed by said rotatable member.

13. The combination according to claim 5 wherein said control means comprises a shaft connected to said film winding means, said shutter driving means comprises a rotatable member including a cam wheel mounted for rotation on said shaft, said clutch means comprises a pin carried by said shaft adapted to engage a lug formed by said rotatable member, and said actuating means comprises a cam follower connected to said mirror and actuable by said cam wheel to release said mirror.

14. The combination according to claim 5 wherein said control means comprises a shaft connected to said film winding means, said shutter driving means comprises a rotatable member including a cam wheel mounted for rotation on said shaft, said clutch means comprises a pin carried by said shaft adapted to engage a lug formed by said rotatable member, said actuating means comprises a cam follower connected to said mirror and actuable by said cam wheel to release said mirror, and said latch comprises a spring biased reciprocally movable bar adapted to releasably engage a shoulder formed by said rotatable member.

15. In a single lens reflex camera having a camera body, a shutter, an objective, and a spring urged mirror and spring urged light-blocking flap pivoted within said body behind the objective to move between an operative position in which they intercept light rays passing through the objective and a normal inoperative position in which they are removed from the path of said light rays, the combination comprising: film winding means; control means connecting said film winding means to said mirror and light blocking flap; shutter driving means; clutch means releasably connecting said control means to said shutter driving means, said control means and said shutter driving means operable upon advance of the film by said film winding means to simultaneously cock said shutter and move said mirror and flap in said operative position; mirror and flap retaining means for releasably holding said mirror and flap in said operative position; a latch for releasably holding said shutter in a cocked position; auxiliary means cooperating with said mirror and flap to prevent the accidental release and movement of said mirror and flap into said inoperative position due to jarring of the body; release means operable when actuated to release said auxiliary means and said latch means; and actuating means including a part of said shutter driving means and operable upon release of said latch to release said mirror and flap retaining means for movement by their springs into said inoperative position in timed relation with the operation of said shutter.

16. The combination according to claim 15 wherein said auxiliary means comprises means for releasably holding said flap in said operative position.

17. The combination according to claim 16 wherein said means for releasably holding said flap comprises a spring-biased, reciprocally movable bar adapted to slidably engage an edge of said flap.

18. The combination according to claim 15 wherein said auxiliary means comprises blocking means including a part of said release means for preventing said actuating means from accidently releasing said mirror.

19. The combination according to claim 18 wherein said blocking means comprises a stop means formed by said release means for releasably stopping said actuating means, and an arm formed by said auxiliary means connected to said stop means.

20. The combination according to claim 19 wherein said release means comprises a spring biased reciprocally movable bar, and said stop means comprises a shoulder formed by said bar and adapted to engage a lever formed by said actuating means.

References Cited in the file of this patent

UNITED STATES PATENTS

| | | |
|---|---|---|
| 2,579,247 | Angenieux | Dec. 18, 1951 |
| 2,730,025 | Faulhaber | Jan. 10, 1956 |

FOREIGN PATENTS

| | | |
|---|---|---|
| 25,849 | Great Britain | June 7, 1909 |
| 863,746 | Germany | Jan. 19, 1953 |
| 866,598 | Germany | Feb. 12, 1953 |